United States Patent
Meier et al.

(10) Patent No.: US 8,424,167 B2
(45) Date of Patent: Apr. 23, 2013

(54) HOSE CLAMPS

(75) Inventors: Ulrich Meier, Waedenswil (CH); Willi Haensli, Horgen (CH)

(73) Assignee: Hans Oetiker AG Maschinen-und Apparatefabrik, Horgen (CH)

( * ) Notice: Subject to any disclaimer, the term of this patent is extended or adjusted under 35 U.S.C. 154(b) by 184 days.

(21) Appl. No.: 12/997,700

(22) PCT Filed: Jun. 18, 2008

(86) PCT No.: PCT/EP2008/004909
§ 371 (c)(1),
(2), (4) Date: Feb. 23, 2011

(87) PCT Pub. No.: WO2009/152832
PCT Pub. Date: Dec. 23, 2009

(65) Prior Publication Data
US 2011/0173779 A1   Jul. 21, 2011

(51) Int. Cl.
*B65D 63/00* (2006.01)
(52) U.S. Cl.
USPC .......................... 24/20 CW; 24/19; 24/20 TT
(58) Field of Classification Search .............. 24/20 CW, 24/19, 20 TT, 23, 20 R, 23 W
See application file for complete search history.

(56) References Cited

U.S. PATENT DOCUMENTS

| | | | |
|---|---|---|---|
| 4,299,012 A | 11/1981 | Oetiker | |
| 4,517,708 A | 5/1985 | Calmettes et al. | |
| 4,711,001 A * | 12/1987 | Oetiker | 24/20 TT |
| 4,724,583 A | 2/1988 | Ojima | |
| 5,177,836 A * | 1/1993 | Kemmerich | 24/20 R |
| 5,283,931 A | 2/1994 | Oetiker | |
| 5,768,751 A * | 6/1998 | Oetiker | 24/20 R |
| 6,560,824 B1* | 5/2003 | Kitamura et al. | 24/20 CW |
| 2003/0014846 A1* | 1/2003 | Kim | 24/20 R |
| 2003/0101544 A1 | 6/2003 | Kitamura et al. | |
| 2004/0134041 A1* | 7/2004 | Craig, Jr. | 24/20 CW |
| 2005/0223526 A1* | 10/2005 | Oetiker et al. | 24/20 CW |

(Continued)

FOREIGN PATENT DOCUMENTS

| | | |
|---|---|---|
| EP | 0 079 252 A1 | 5/1983 |
| JP | 11-223287 | 8/1999 |
| RU | 2166673 C2 | 5/2001 |
| RU | 2243442 C2 | 12/2004 |

*Primary Examiner* — Robert J Sandy
*Assistant Examiner* — Abigail E Morrell
(74) *Attorney, Agent, or Firm* — Barnes & Thornburg LLP

(57) ABSTRACT

Connecting the two band ends 10, 18 of a hose clamp is done by means of a guide hook 16 disposed on an inner band portion and engaging a guide hook receiving means 12 on the outer band end 10, and a support hook 17 also formed on the inner band portion and engaging a support hook receiving means 13 on the outer band portion. The support hook receiving means 13 is an embossment formed from the band material by cold deformation and being continuous with the band material on all sides, the inner surface of the support hook receiving means 13 having a support portion 25 adjacent to the outer band end 10 and extending at right angles with respect to the band surface. The support hook 17 has a nose 26 which faces away from the inner band end 18 and has a cut edge which nicks into the support portion 25 of the support hook receiving means 13 when the hose clamp is tightened. Since the support hook receiving means 13 is entirely continuous with the band material, it has a much higher stability then conventional cut-outs or windows formed in the band.

6 Claims, 1 Drawing Sheet

U.S. PATENT DOCUMENTS

2006/0117534 A1* 6/2006 Craig, Jr. .................. 24/20 CW
2007/0186387 A1 8/2007 Ogino et al.
2009/0172824 A1 7/2009 Colburn
2009/0172924 A1* 7/2009 Ito et al. .................... 24/20 CW
2009/0235492 A1* 9/2009 Streuli .............................. 24/19

* cited by examiner

HOSE CLAMPS

BACKGROUND

U.S. Pat. No. 4,299,012 discloses a conventional hose clamp. The inner surface of this hose clamp, in the tightened condition, is free of gaps and steps; therefore, it supports the hose at all locations of its periphery. As a result, the known clamp has been found suitable for mounting thin, hard hoses to pipe nipples.

For connecting the outer band end with the inner band portion, the known hose clamp has a guide hook and at least one holding or support hook disposed on the inner band portion. In the closed condition, each of the guide and support hooks engages a window formed in the outer band portion.

In hoses of decreasing thickness and elasticity and with the correspondingly increasing tightening forces required, the hook connection becomes a weak point. Thus, the window next to the tightening means, which may be a so-called "Oetiker-ear", tends to extend and finally tear under excessive forces. This problem may be overcome by using a more elastic higher quality steel but this increases cost.

SUMMARY

The disclosed embodiments at least in part avoid such disadvantages as occur with comparable hose clamps of the prior art.

More specifically, the disclosed embodiments provide an improvement of the hook connection of a hose clamp, specifically with respect to its stability.

In accordance with the disclosed embodiments, the means for receiving the support hook is no longer formed as a cut-out or window but as an embossment which is cold-deformed from the band material and which is closed on all sides and therefore capable of taking up essentially higher forces. To achieve an anchoring of the support hook in the support hook receiving means, a support portion of the receiving means has an inner surface extending at an angle of at least 90° with respect to the band surface. The support hook has a nose by which it may hook into this support portion. The closed shape of the receiving means has the additional advantage that the support hook does not protrude outward; thus, it does not involve a risk of injury.

In accordance with at least one disclosed embodiment, the support hook itself is also stamped from the band material by cold deformation and is cut-out only in the area of its nose. This shape provides the support hook with high stability.

In accordance with at least one disclosed embodiment, the shape causes the nose of the support hook to assume the desired position at the support surface of the support hook receiving means when the hose clamp is closed.

In accordance with at least one disclosed embodiment, similar shape and stability are given also to the guide hook and the guide hook receiving means, wherein this receiving means, however, has an opening for passing a tip provided on the guiding hook. The tip, which may be produced by an L-shaped cut in the band material, may effect a mutual centring of the two band ends upon engagement and retain the support hook in engagement with its receiving means already in the non-tightened condition of the hose clamp.

In accordance with at least one disclosed embodiment, the tip of the guide hook extends substantially parallel to the band surface and in its engaged condition overlaps the band material adjacent to the opening in the guide hook receiving means. In this embodiment, the closed condition of the clamp may be fixed by a knock on the guide hook receiving means. This type of fixation is simpler than bending a tab-like guide hook passed through a guiding slot, as is done in the prior art.

BRIEF DESCRIPTION OF THE DRAWING

An embodiment of the invention will be explained in more detail below with reference to the drawing, in which.

DETAILED DESCRIPTION

Figure 1:
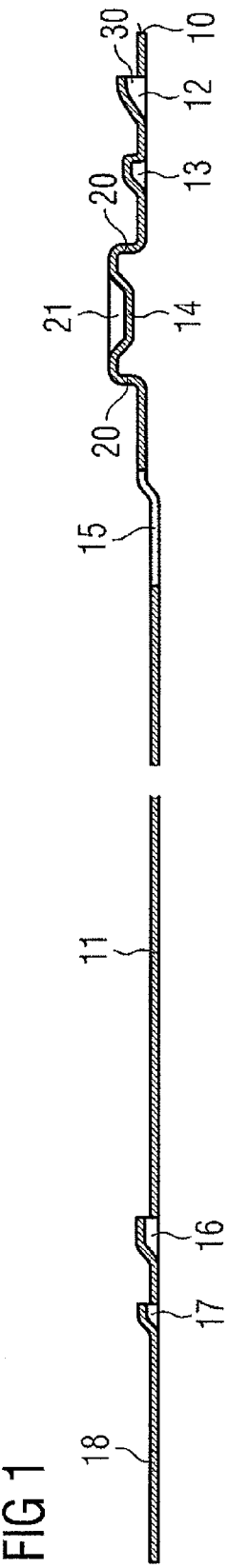
FIG. 1 is a longitudinal section through a hose clamp in a straight condition in which it has not yet been bent to form a ring.
Figure 2:
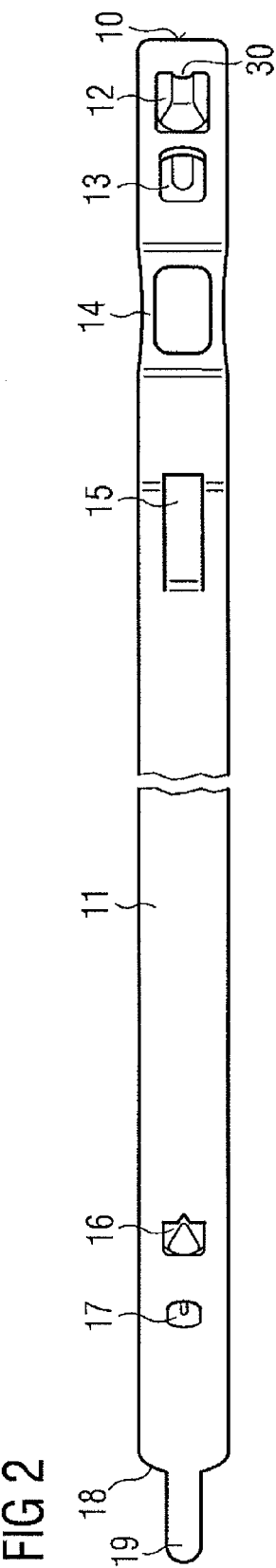
FIG. 2 is a top view of the hose clamp according to FIG. 1.

The hose clamp shown in the drawing includes the following features, starting from the right-hand band end 10 according to FIGS. 1 and 2, which end is on the outer side in the closed condition of the hose clamp, which features are formed by cold deformation from the steel band 11: a guide hook receiving means 12, a support hook receiving means 13, a tightening means in the form of a so-called "Oetiker ear" 14, a tongue guide 15, a guide hook 16, a support hook 17 and a tongue 19, the tongue being at the other band end 18 which is on the inner side in the closed condition of the hose clamp.

Figure 3:
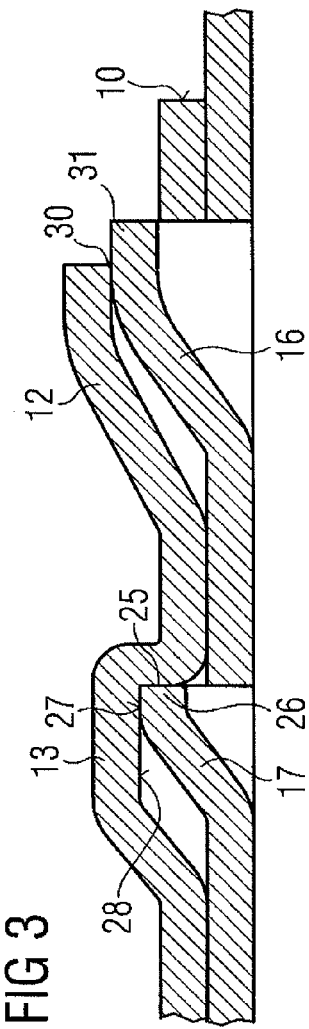
FIG. 3 is an enlarged longitudinal section through a part of the overlapping portion of the hose clamp, showing the hook arrangement in the engaged condition.

In the closed condition of the hose clamp shown in FIG. 3, the guide hook 16 engages the guide hook receiving means 12, the support hook 17 engages the support hook receiving means 13, and the tongue 19 engages the tongue guide 15.

To tighten the clamp by reducing its diameter, a plier-type tool (not shown) is applied to the two legs 20 of the tightening ear 14 which extend at substantially right angles from the band, in order to reduce the spacing between the ends of the legs 20 connected to the band 11. A bead 21 provided in the tightening ear 14 prevents the web interconnecting the legs 20 from buckling.

The support hook receiving means 13 is stamped from the band material by cold deformation and, as best seen in FIGS. 2 and 3, is closed throughout its periphery so as to be completely continuous with the band material. The inner surface of the support hook receiving means 13 has a support portion 25 adjacent to the outer band end 10, which support portion forms an angle of 90° with the band surface.

The support hook 17 is also stamped from the band material by cold deformation and is continuous with the band material throughout its periphery except at a location remote from the inner band end. At this location, the support hook 17 is separated from the band material by a cut performed prior to the deformation to create a nose 26 protruding beyond the thickness of the band 11.

The roof surface 27 of the nose 26 and the upper inner surface 28 of the support hook receiving means 13 extend parallel to the surface of the band 11. This contributes to the nose 26 being guided toward the support portion 25 when the clamp is closed. The forces which occur when the clamp is tightened and which act in the longitudinal direction of the band cause the cut edge of the nose 26 to nick into the support portion 25 of the support hook receiving means 13.

The guide hook receiving means 12 is also stamped from the band material by cold deformation and has an opening 30 formed by a cut in the band material at the side nearer to the outer band end 10, the receiving means being otherwise continuous with the band material throughout its remaining periphery.

Finally, the guide hook 16 is also stamped from the band material by cold deformation and is continuous with the band material except at its side remote from the inner band end 18. At the side remote from the inner band end 18, the guide hook 16 is separated from the band material by an overall L-shaped cut formed by two straight lines. The L-shaped cut has a tip pointing away from the inner band end 18. In this way, the bent-out support hook 16 is formed with a triangular tip 31 pointing away from the inner band end.

The tip 31 of the guide hook 16 and the roof surface of the guide hook receiving means 12 extend parallel to the band surface.

When the hose clamp is closed and the guide hook 16 engages the guide hook receiving means 12, the tip 31 is passed through the opening 30 of the guide hook receiving means 12 extending perpendicularly to the band surface and comes to lie on the portion of the band 11 adjacent to the opening 30. The two band ends 10, 18 are thus mutually centred, and the support hook 17 is retained within the support hook receiving means 13 before the hose clamp is tightened.

Upon closing the hose clamp, the engagement between the guide hook 16 and the guide hook receiving means 12 is fixed by a knock on the guide hook receiving means 12. Thereafter, the hose clamp is tightened around the respective object, such as a nipple-hose connection, by narrowing the tightening ear 14. During this action, the tongue 19 moves within the tongue guide 15. In the completely tightened condition, the unavoidable gap between the inner ends of the legs 20 of the tightening ear 14 is overlapped by the full width of the inner band portion adjacent to the tongue 19.

LIST OF REFERENCE NUMBERS

10 outer band end
11 band
12 guide hook receiving means
13 support hook receiving means
14 tightening ear
15 tongue guide
16 guide hook
17 support hook
18 inner band end
19 tongue
20 legs of 14
21 bead in 14
25 support portion of 13
26 nose of 17
27 roof surface of 17
28 upper inner surface of 13
30 opening of 12
31 tip of 16

The invention claimed is:

1. A hose clamp formed of a band with mutually overlapping inner and outer band ends, comprising:
    guide hook receiving means formed near said outer band end;
    a guide hook disposed on an inner band portion for engagement with said guide hook receiving means;
    support hook receiving means disposed in an outer band portion by an embossment formed from the band material and closed on all sides, an inner surface of said support hook receiving means having a support portion adjacent to said outer band end, said support portion forming an angle of at least 90° with an outer surface of the band;
    a support hook disposed on said inner band portion and spaced from said guide hook toward said inner band end for engaging said support hook receiving means, the support hook having a nose pointing away from said inner band end for engaging the support portion of said support hook receiving means; and
    tightening means for reducing the diameter of the hose clamp.

2. The hose clamp of claim 1, wherein said support hook is an embossment formed from the band material and being cut-out only within the area of said nose.

3. The hose clamp of claim 1, wherein a roof surface of said support hook and an upper inner surface of said support hook receiving means extend parallel to the surface of the band.

4. The hose clamp of claim 1, wherein said guide hook receiving means is an embossment formed from the band material and having an opening facing said outer band end and extending at substantially right angles with respect to the surface of the band, and said guide hook is an embossment formed from the band material and having a tip pointing toward said outer band end for passing through said opening of the guide hook receiving means.

5. The hose clamp of claim 4, wherein said tip of said guide hook extends substantially parallel to the surface of the band and, in the closed condition of the hose clamp, overlaps a portion of the band adjacent said opening of said guide hook receiving means.

6. The hose clamp of claim 4, wherein said tip of said guide hook is formed by an L-shaped cut in the band material.

* * * * *